United States Patent
Haynes et al.

(10) Patent No.: US 10,704,924 B2
(45) Date of Patent: Jul. 7, 2020

(54) METER READING SCHEMA TO ENHANCE SYSTEM FUNCTIONALITY

(71) Applicant: ACLARA TECHNOLOGIES LLC, St. Louis, MO (US)

(72) Inventors: David Haynes, St. Peters, MO (US); Todd Ellis, Ballwin, MO (US)

(73) Assignee: Aclara Technologies LLC, St. Louis, MO (US)

( * ) Notice: Subject to any disclaimer, the term of this patent is extended or adjusted under 35 U.S.C. 154(b) by 0 days.

(21) Appl. No.: 15/718,638

(22) Filed: Sep. 28, 2017

(65) Prior Publication Data
US 2018/0094948 A1    Apr. 5, 2018

Related U.S. Application Data

(60) Provisional application No. 62/402,099, filed on Sep. 30, 2016.

(51) Int. Cl.
*G01D 4/00* (2006.01)
*H04Q 9/00* (2006.01)
(Continued)

(52) U.S. Cl.
CPC .............. *G01D 4/006* (2013.01); *G06Q 50/06* (2013.01); *H04Q 9/00* (2013.01); *H04W 4/70* (2018.02);
(Continued)

(58) Field of Classification Search
CPC .......... G01D 4/00; G01D 4/002; G01D 4/004; G01D 4/006; G01D 4/008; H04Q 2209/00;
(Continued)

(56) References Cited

U.S. PATENT DOCUMENTS 6,393,341 B1 * 5/2002 Lawrence ................. G06F 9/54
700/286
6,836,737 B2   12/2004 Petite et al.
(Continued)

FOREIGN PATENT DOCUMENTS

EP         2897299 A1      7/2015

OTHER PUBLICATIONS

Author: IEC, Title: Application Integration at Electric Utilities—System Interfaces for Distribution Management—Part 9: Interfaces for Meter Reading and Control, Date: Oct. 2013, pp. 1-16 (Year: 2013).*

(Continued)

*Primary Examiner* — Franklin D Balseca
(74) *Attorney, Agent, or Firm* — Michael Best & Friedrich, LLP

(57) ABSTRACT

An improvement to a utility (U) meter's (M) meter reading schema. The improvement includes a device (D) responsive to a native language with which a meter is programmed to convert communications to and from the meter from that native language into a neutral language. The neutral language is convertible by other meters programmed with different native languages into the native language of a particular meter for meters programmed with different native languages can communicate with each other. This allows facilities within a localized area of a utility's power grid (G) to form into a micro-grid (MG) in which meters programmed with the same or different native languages can communicate with each other without having communications between them routed through a central location of the utility.

7 Claims, 4 Drawing Sheets

(51) Int. Cl.
*H04W 4/70* (2018.01)
*G06Q 50/06* (2012.01)
*H04L 29/08* (2006.01)

(52) U.S. Cl.
CPC ............ *G01D 4/002* (2013.01); *H04L 69/329* (2013.01); *H04Q 2209/60* (2013.01); *Y02B 90/241* (2013.01); *Y02B 90/242* (2013.01); *Y02B 90/246* (2013.01); *Y04S 20/32* (2013.01); *Y04S 20/322* (2013.01); *Y04S 20/42* (2013.01)

(58) Field of Classification Search
CPC ........... H04Q 2209/10; H04Q 2209/20; H04Q 2209/25; H04Q 2209/30; H04Q 2209/40; H04Q 2209/50; H04Q 2209/60; H04Q 2209/80; H04Q 9/00; G06Q 50/06; H04W 4/70; H04L 69/329; H04B 3/54; H04B 3/542; H04B 3/544; H04B 3/546; H04B 3/548; Y02B 90/241; Y02B 90/242; Y02B 90/246; Y04S 20/32; Y04S 20/322; Y04S 20/42
See application file for complete search history.

(56) References Cited

U.S. PATENT DOCUMENTS

| | | | |
|---|---|---|---|
| 8,423,637 B2* | 4/2013 | Vaswani | G01D 4/004 709/224 |
| 8,884,774 B2 | 11/2014 | Sanderford, Jr. | |
| 9,440,193 B2 | 9/2016 | Lida et al. | |
| 2003/0069922 A1* | 4/2003 | Arunachalam | G06Q 20/04 709/203 |
| 2008/0018491 A1 | 1/2008 | Berkman et al. | |
| 2008/0074285 A1* | 3/2008 | Guthrie | G01D 4/004 340/870.02 |
| 2010/0283606 A1 | 11/2010 | Tsypin et al. | |
| 2012/0057592 A1* | 3/2012 | Zeppetelle | G01D 4/004 370/390 |
| 2015/0097694 A1 | 4/2015 | Laval et al. | |

OTHER PUBLICATIONS

Derhamy et al., "Translation Error Handling for Multi-Protocol SOA Systems," IEEE 20th Conference on Emerging Technologies & Factory Automation, 2015.

* cited by examiner

METER READING SCHEMA TO ENHANCE SYSTEM FUNCTIONALITY

REFERENCE TO RELATED APPLICATIONS

This applications is based on, and claims the benefit of, U.S. provisional patent application 62/402,099 filed Sep. 30, 2016, and which is incorporated herein by reference.

BACKGROUND OF THE INVENTION

This invention relates to communications in electric and other utilities; and, more particularly, to a method and improvements for enhanced communications between disparate installations in a utility's distribution system under a wide variety of operational conditions.

A utility supplies a particular commodity (electricity, gas, water) through a distribution system to numerous end users. Each utility has a dedicated supply network or grid by which the commodity is routed from a central site or sites to the location of the respective end users. It is now commonplace for a measuring device or meter such as a "smart meter" to be installed at each using facility's location, the meter measuring the amount of the commodity dispensed to and/or used at that particular site. Over time communication systems have been developed which enable a central location of the utility to link with and access the user location through the meter to, for example, obtain current commodity usage rates, control use rates of the commodity under certain conditions, etc. Examples of such communication systems include a two-way automatic communications system for a power line carrier or power line communications system (i.e. Aclara Technologies, TWACS®), as well as a radio frequency (RF) system and landline communications systems.

Referring to FIG. 1, a utility U, for example an electric utility, generates electricity which is propagated through power lines L from a central location such as a sub-station S to numerous end user sites such as residential, commercial, or manufacturing establishments or facilities F. It will be understood that while many sites F rely solely on the electricity transmitted over the power lines to operate machinery, systems, and appliances at the facility, some facilities such as facilities F1 and F2 may use local, alternate power sources in addition to the power supplied by the utility. So, for example, facility F1 employs solar panels SP as a primary or secondary source of power; while facility F2 has its own generator G used for this purpose. Regardless, each facility connected to the utility has a meter such as a smart meter M installed at the facility to measure the amount of usage of the commodity (i.e., electricity) supplied to the facility. A communications link C enables correspondence between the utility and each facility connected in the utility's power grid.

Sometimes disruptions occur which prevent the commodity provided by a utility from reaching some or all of the using sites. For example, in an electrical grid, a power line may be downed during a storm or a transformer may be struck by lightning resulting in a power outage. In such instances, querying by the utility's communications system helps identify the location of the outage as well as its extent, so service can be quickly restored.

One problem with today's utility systems is their vulnerability to natural and manmade catastrophes. Computer hackers, for example, have tried to, and in some instances succeeded, in disrupting a utility's operations. Also, there is the increasing threat of terrorists damaging vital portions of the utility's infrastructure incapacitating the utility. It has been known for years that high energy electrical impulses produced by a nuclear explosion can destroy integrated circuit chips which are the heart of the electronics now universally employed throughout homes and industries, including utility systems, causing massive power disruptions.

With respect to natural causes, there is, for example, the susceptibility to solar flares such as those responsible for the so-called Carrington Event of 1859. In that instance, a geomagnetic storm was produced by an intense solar flare. The resulting coronal mass ejection from the sun reached the earth in less than 18 hours and among other things resulted in the failure of telegraph systems throughout North America and Europe. A similar geomagnetic storm in March, 1989 disrupted power across large sections of the Quebec province in Canada. Another "Carrington-class" storm occurred in July, 2012, but missed the earth's orbit. Significantly, in 2013, a joint venture including both insurance companies and scientific groups estimated that the current cost of a Carrington event affecting the U.S. could exceed over $1 trillion in damages. (See www.wikipedia.org under the heading "Solar storm of 1859").

There is, accordingly, a need to provide operational safeguards to utilities to protect from, or ameliorate, the effects from the possible occurrence of these events.

In addition to the above, utilities currently employ versions of open communications interconnection (OSI) protocols for communications throughout their communications system to obtain operational data, control operations at particular sites, and confirm that the requested operations are performed. An OSI is characterized by its ability to provide communication functions without regard to a utility's underlying internal structure and the technology employed in the system. As understood by those skilled in the art, an OSI classifies the communications process into a series of interconnected layers defined as follows:

Layer 1—physical layer;
Layer 2—data link layer;
Layer 3—network layer;
Layer 4—transport layer;
Layer 5—session layer;
Layer 6—presentation layer; and,
Layer 7—application layer.

A brief overview of an OSI and each of these layers is found at www.wikipedia.org under the heading "OSI model". A more detailed description of each layer, its functions and operations is found in, for example, Computer Networks, 5th ed., by Tanenbaum and Withal.

Those skilled in the art understand that, at each layer, two entities exchange information/data using an established protocol for that layer. The particular characteristics for each layer and the protocols employed thereat are available in the above references, as well as elsewhere, and are not described herein. It is understood, however, that current protocols available to systems' users are adaptable to a particular system application.

As one example, an International Electrotechnical Commission standard; i.e., IEC 61968-0:2013 is used in utility RF communication systems, at the applications layer, to communicate between a central utility location C, as indicated in FIG. 1, and meters M installed at using sites or facilities F. The IEC 61968-0:2013 standard has different schema (i.e., 48 schema) defined for respective purposes of a communication. One such schema is, for example, to request a meter reading at a site F, and to report the meter reading back to the central location.

A problem with the present schema is that even though some of them are quite large, they are still not necessarily adequate to meet a utility's need for certain applications. Also, the current schema is somewhat cumbersome. For example, a "read meter" request in the IEC 61968-0:2013 format is formulated as a string, and an extensive technique (not described) is required to build an identifier which describes the unit of measure for an electric meter M's measurement. The format uses both whole numbers (integers) and dots (".").

Thus, to request a typical dial reading off the face of a residential electricity meter M, the identifier used in an Application Programming Interface (API) would be, for example, 0.0.0.1.4.1.12.0.0.0.0.0.0.0.0.3.72.0, the construction rules specifying 18 fields composed of characters; i.e., the digits and the dots.

SUMMARY OF THE INVENTION

The present invention is directed to improvements in electric utility meter reading schema to enhance the functionality of a utility's communication system. The improvements facilitate the creation of appropriate messages sent to facilities using programming techniques which both simplify the message as well as increase the number and types of messages transmitted; the latter enabling a utility to define custom "parameters" which are read, written, and interpreted in the same manner as with other standardized message formats.

The improvements include conversion of a device's native language (the language with which the device was programmed) into a neutral language for carrying messages from a point of origination or Head End to a receiving location or End Point so devices having different native languages can readily communicate with each other. This creates an opportunity for an "Internet of Things" capability.

The improvements enable facilities within a local area; i.e., a micro-grid, of a utility to employ alternate channels of communications between them in the event regular communications fail for some reason so that these facilities can reliably communicate back-and-forth separately from the utility's normal communications channels until normal communications are restored. Facilities within the locale (micro-grid) are now able to check on each other's status, carry out emergency operations at a particular site, if necessary, and otherwise assist each other during the event without having to be routed through the utility's central communication facility. Doing so permits de-centralized communications.

The improvements enable "end point" configurability; i.e., the ability to set up a communications module within a smart meter located at a particular site (an end point) while not affecting either normal communications at that site, or communications with other meters at other locations.

Further, the improvements facilitate communications between dissimilar devices; e.g., meters made by different manufacturers or which use different language protocols so to eliminate problems resulting from the use of dissimilar equipment within the system.

The improvements, which are facilitated by a device located at a "head end" location such as a substation of a utility's distribution grid, enhance OSI communications protocols at the applications level of the utility's communications system.

Corresponding reference characters indicate corresponding parts throughout the several views of the drawings.

DETAILED DESCRIPTION OF THE INVENTION

Figure 1:
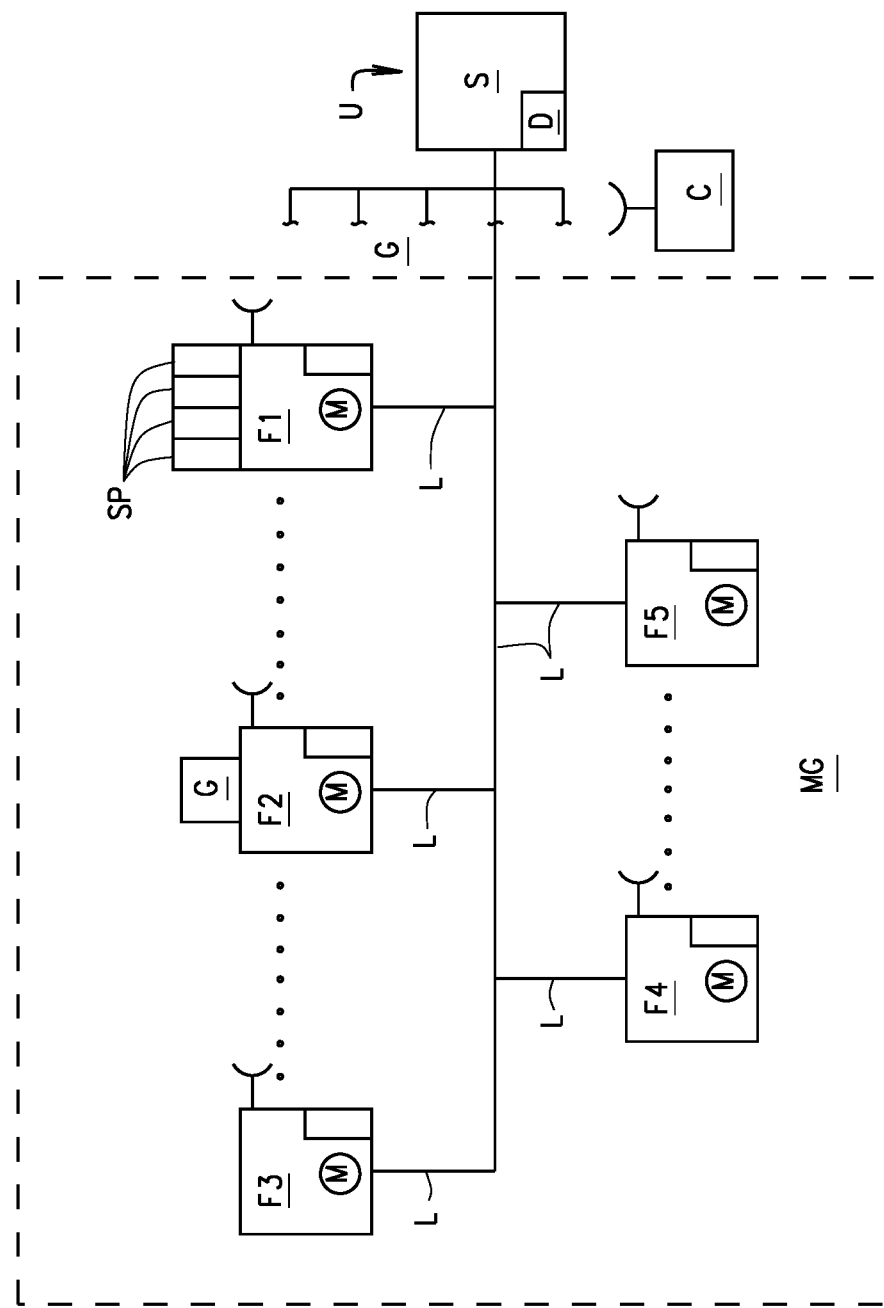
FIG. 1 is a simplified representation of a utility's power grid.

The following detailed description illustrates the invention by way of example and not by way of limitation. This description clearly enables one skilled in the art to make and use the invention, and describes several embodiments, adaptations, variations, alternatives and uses of the invention, including what is presently believed to be the best mode of carrying out the invention. Additionally, it is to be understood that the invention is not limited in its application to the details of construction and the arrangement of components set forth in the following description or illustrated in the drawings. The invention is capable of other embodiments and of being practiced or carried out in various ways. Also, it will be understood that the phraseology and terminology used herein is for the purpose of description and should not be regarded as limiting.

Figure 2:
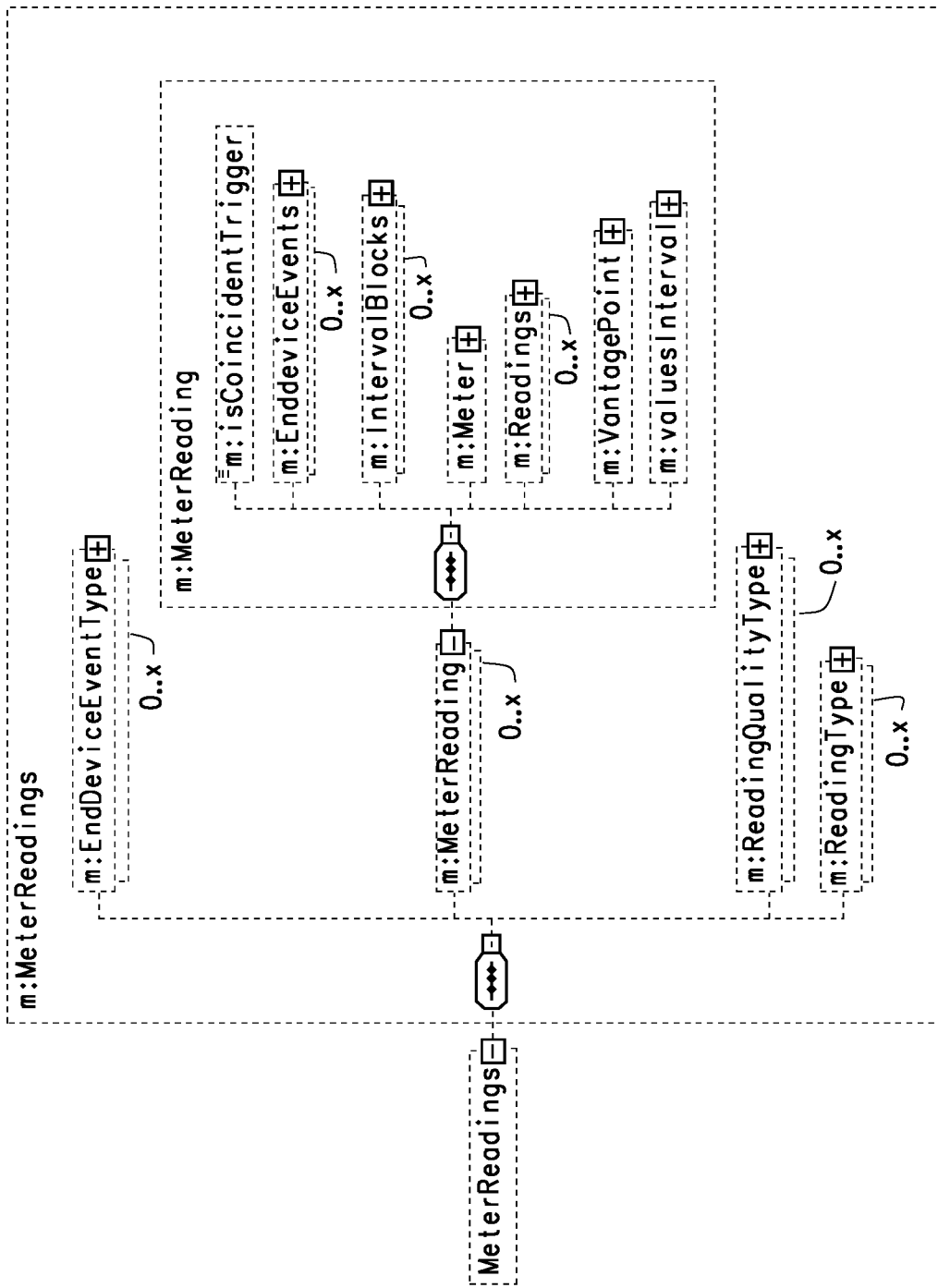
FIGS. 2-4 illustrate an IEC 61968-9 schema for meter readings and end device events.
Figure 3:
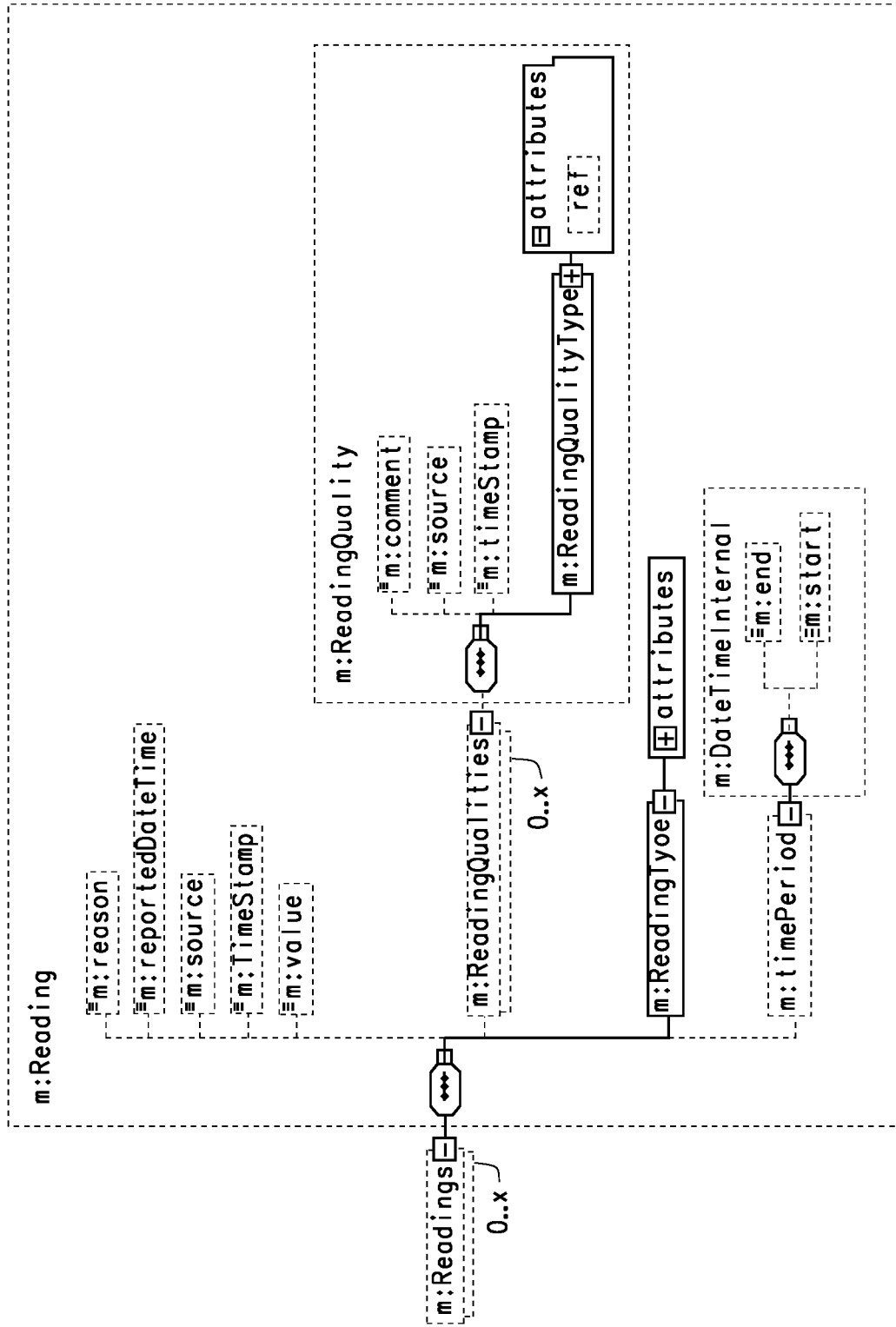
Figure 4:
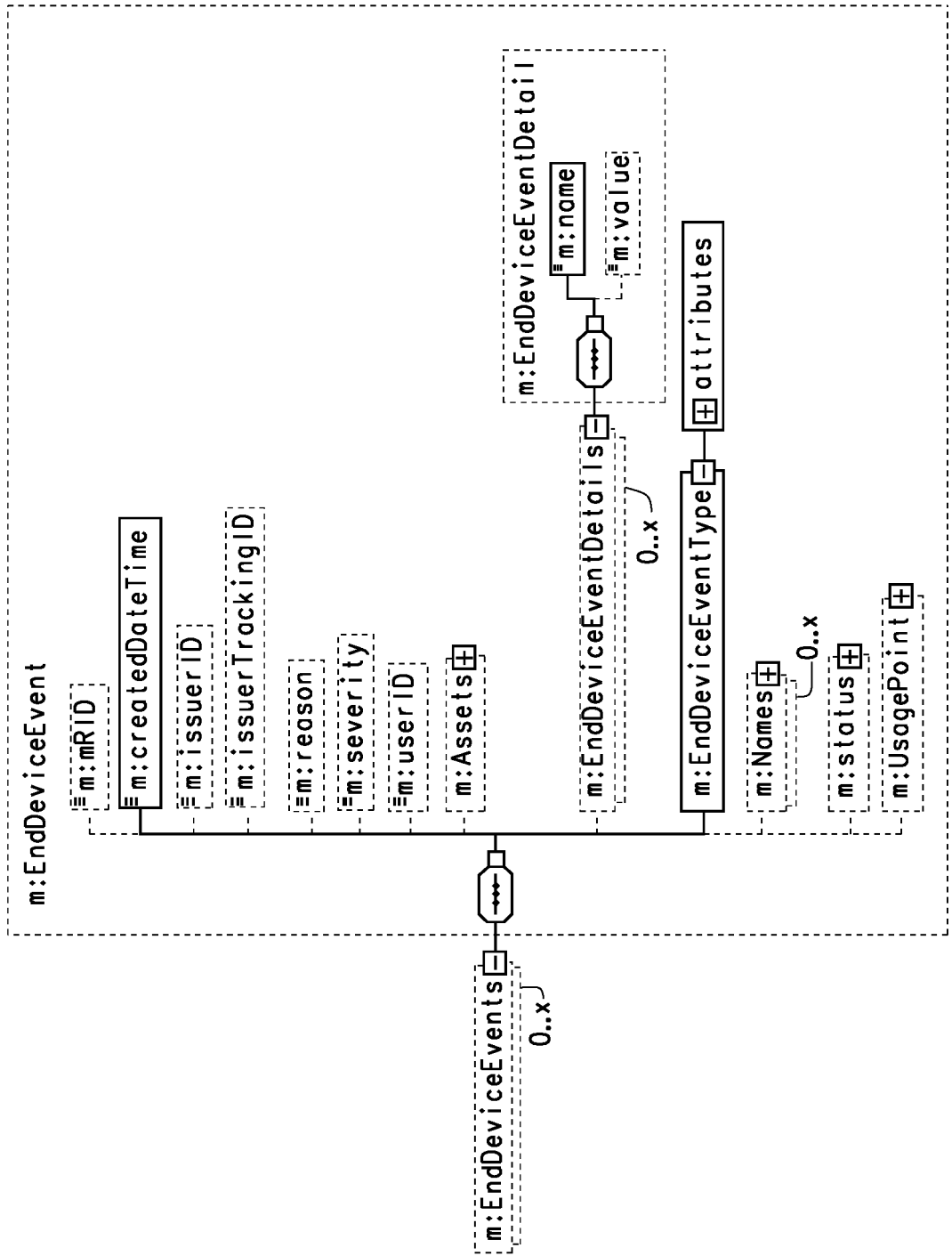

In accordance with the present invention, a smart meter M utilizes the IEC 61968-9:2013 (hereinafter "Part-9") schema standard as a neutral language. As such, the Part-9 standard supports operation of any smart meter M, regardless of its source of manufacture, including system control and data acquisition (i.e., SCADA) operations. The Part-9 standard can be extended as required and is used to define or "map" each meter in the original or "native" language with which the meter was programmed during its manufacture. An example of the use of the Part-9 schema for reading a meter, for example, is shown in FIGS. 2-4.

In accordance with the invention, a translation protocol or device D converts the native language of a meter into the neutral language which, once implemented, provides a common semantic understanding between a message's sender, which is sometimes referred to as the "Head End" or "HE", and the message's receiver, which is sometimes referred to as the "End Point" or "EP". As previously noted, this neutral language is employed at the application layer of a protocol stack. Device D may be located at a substation S as shown in FIG. 1 or other convenient Head End location.

In operation, translating device D services one or more native languages including: ANSI C12, IEC-61850, DNP, SEP, DLMS/COSEM, other standard application-layer languages, and other proprietary application-layer languages.

Translating device D is installed outside of the equipment; e.g., meters M, which are issuing or receiving messages; and, it can be integrated into a communication module located at a Head End facility, substation S, for example, to provide translation within a communications channel. Further, each meter has a communications module programmable to communicate with meters programmed for a different native language.

In FIG. 1, be bi-directional communications over a grid G of the utility are routed through a central controller located at the substation. In such a communications scheme, translation is also bi-directional. Accordingly, an end point or meter M is able to communicate back to a central controller located at substation S and can also route traffic to other devices connected via the same central controller. This is done using Internet Protocols versions 4 or 6 (IPv4, IPv6) or a Network Address Translation (NAT) protocol to communicate back to the central controller and be backhauled to a Head End. Data acquired by a meter M or other equipment is routed to a back office advanced metering interface (AMI) Head End as well as to a back office SCADA Head End or a centralized or back office energy management system (EMS).

An advantage of the above is that in addition to communications over the utility's grid G, it is now possible for communications within a localized area such as the micro-grid MG designated in FIG. 1 to be performed. Situations where communications within a micro-grid are desirable include those where network wide communications are halted due to a storm or other natural causes as well as manmade incidents. In such instances, the improvements of the invention now allow the facilities F1-F5 in FIG. 1 to communicate with each other, but not necessarily to substation S or other sections of the utility grid, so to determine the operational status at each facility, any configuration changes needed at a facility in order for continued functioning of equipment at the facility, and data acquisition. Since the meters or other equipment at one facility may not necessarily be the same as that at other facilities within micro-grid MG, the ability to go from a native language to a neutral language allows communications to timely occur locally without requiring communication backhaul to a central office such as substation S.

Within micro-grid MG, the local communications are point-to-point or peer-to-peer, and are routed through the micro-grid's communication infrastructure without reaching a Head End. The communications are routed through the meters M at the various facilities F1-F5 to, for example, consumer appliances, in-home displays, utility distribution automation including, for example:
- capacitor bank controllers, transformer tap changers, switch reclosers, micro-grid controllers, inverters, and distributed generation equipment;
- demand response applications for load control and price response, etc.;
- outage detection and power restoration management equipment including lineman diagnostic tools; and,
- health monitoring equipment.

A distributed micro-grid controller, for example, allows inputs for a locally determined action such as distribution-side voltage sag so to inform a storage battery array that it needs to begin to provide an output to meet load demands.

With regard to mapping, as previously noted, the IEC 61968-9 standard has been selected as the neutral language. Mappings created between the neutral language and the equipment's native language entail an equivalency between a "restful" architecture and the equipment's native architecture. On the restful side, a resource and a verb are identified to perform a particular action. On the equipment side, this involves a process workflow usually including "reading" or "writing" data elements, and possibly the creation and close-out of secure sessions. Further on the restful side, parameters are supplied to specify exactly what is to be done; i.e., acquire data, perform a function, etc. On the equipment side, specific neutral parameters are mapped to specific native parameters. The formats of both are specified, along with a conversion formula.

An example of a mapping from an end point's native language to and from the neutral language is provided below. Preferably, mappings are maintained in a tabular form but can be expressed in BPEL (Business Process Execution Language), OWL (Ontology Web Language), as well as other means.

| Neutral Language | | | Native Language |
|---|---|---|---|
| Reading Type ID | Reading Type Description | Format | ANSI C12.19 Location |
| 0.0.0.1.1.1.12.0.0.0.0.0.0.0.3.72.0 | bulkQuantity forward electricitySecondaryMetered energy (kWh) | Decimal | TOTAL_DEL_KWH (MFG Table 19, Length 4B, Offset 4B) |
| 0.0.0.1.20.1.12.0.0.0.0.0.0.0.3.72.0 | bulkQuantity total electricitySecondaryMetered energy (kWh) | Decimal | TOTAL_DEL_PLUS_RCVD_KWH (MFG Table 19, Length 4B, Offset 8B) |
| 0.0.0.1.4.1.12.0.0.0.0.0.0.0.3.72.0 | bulkQuantity net electricitySecondaryMetered energy (kWh) | Decimal | TOTAL_DEL_MINUS_RCVD_KWH (MFG Table 19, Length 4B, Offset 12B) |
| 0.0.0.1.19.1.12.0.0.0.0.0.0.0.3.72.0 | bulkQuantity reverse electricitySecondaryMetered energy (kWh) | Decimal | TOTAL_REC_KWH (MFG Table 19, Length 4B, Offset 16B) |

The following example is for a meter reading definition. A conversion formula is also supplied in Y56109FDS:

$$Ke = \frac{Mp \times Kh}{1000}$$

Equation I, The definition of Ke for Metered Usage (Secondary Reading)

$$Energy_{kWh} = (Energy_{pulses} \times Ke \times Rp) + InitialOffset_{kWh}$$

Equation 2, BulkQuantity Energy Pulses to kWh conversion

Where, $Energy_{kWh}$=Energy in its finished form as a useable business value.

$Energy_{pulses}$=Energy in a raw form from the meter

Mp, is the number of meter disk revolutions per pulse. (This value may be used to normalize pulses. For electromechanical meters it is customarily computed as the 1/"the number of stripes on the disk". For solid-state meters, this is ratio of normalized pulses to actual pulses).

Kh, is the number of Watt-hours per disk revolution.

Rp=AMR decompression scalar. (Normally, for usage calculations Rp=1).

$InitialOffset_{kWh}$=The value determined at time of integration which defines the difference between the dial reading and the corresponding register reading expressed in kWh.

Importantly, use of a neutral language to carry messages creates opportunities for an Internet of Things capability. To achieve this, adapters or translating devices D are built at each end of a communications network to convert the neutral language to the local or native language. An exception to this would be a utility's back office since the language chosen as the neutral language is the language of the back office. Future developments include developing an enclosure that contains a device D and a communications synergization module that allows almost any distribution automation (DA) device to be connected into the system. The DA devices would have autonomous analysis capabilities to communicate with meters M so to obtain field environment conditions such as voltage or demand.

In view of the above, it will be seen that the several objects and advantages of the present disclosure have been achieved and other advantageous results have been obtained.

The invention claimed is:

1. A utility system supplying, through a distribution system, electricity to a plurality of facilities within a localized area of a power grid of the utility system, the utility system comprising:
   a communications network comprising a central controller located at a utility substation and a plurality of meters, wherein the utility substation supplies energy to the plurality of facilities within the localized area of the power grid, and the plurality of meters includes a meter located at each facility of the plurality of facilities within the localized area of the power grid; and
   a translating device connected to the communications network;
   wherein the communications network provides bi-directional communications between the plurality of facilities within the localized area of the power grid and is used for routing bi-directional communications from one network device of a plurality of network devices to other network devices of the plurality of network devices;
   wherein the one network device of the plurality of network devices comprises a first utility meter measuring electricity usage at one facility of the plurality of facilities within the localized area of the power grid, and the other network devices of the plurality of network devices comprises a second utility meter located at a separate facility of the plurality of facilities within the localized area of the power grid;
   wherein all of the bi-directional communications between the plurality of facilities within the localized area of the power grid are routed through the central controller;
   wherein a first group of network devices of the plurality of network devices uses one native language with which network devices of the first group were programmed for effecting bi-directional communications, and a second group of network devices of the plurality of network devices uses different native languages with which network devices of the second group were programmed for effecting bi-directional communications;
   wherein the translating device affects communication message writing, reading and interpretation schema of the first meter at an application layer (Layer 7) of an open communications interconnection (OSI) message stack; and
   wherein the translating device converts a native language, with which the first utility meter was programmed, into a neutral language for carrying a message from a point of origin of the message to a receiving location where the second utility meter is located, and the second utility meter converts the message from the neutral language into a native language with which the second utility meter was programmed to allow communication between the first utility meter and the second utility meter, thereby eliminating problems resulting from use of dissimilar meters within said localized area, preventing disruption in bi-directional communications if a natural or manmade disruption occurs, and permitting the plurality of meters within the localized area of the power grid to continue communicating with each other using the translating device even if the plurality of meters within the localized area of the power grid cannot do so through the central controller at the utility substation.

2. The utility system of claim 1, wherein the neutral language is an IEC 61968-9:2013 standard for an open communications interconnection (OSI) protocol.

3. The utility system of claim 2, wherein the IEC 61968-9:2013 standard is applied at an application layer (Layer 7) of the OSI protocol.

4. The utility system of claim 1, wherein the translating device provides an end point (EP) configurability by which a communications module within the first utility meter is configured to enable the first utility meter to communicate with other meters of the plurality of meters programmed to use a different native language than the first utility meter without affecting other bi-directional communications between the first utility meter and other meters of the plurality of meters programmed with same native language as the first utility meter.

5. The utility system of claim 4, wherein a communications module within each meter of the plurality of meters is configured to enable a corresponding meter to communicate with other meters of the plurality of meters programmed to use a different native language than the corresponding meter without affecting other bi-directional communications between the corresponding meter and other meters of the plurality of meters programmed with same native language as the corresponding meter in order to provide end point configurability for each meter of the plurality of meters.

6. The utility system of claim 5, wherein the bi-directional communications between the plurality of facilities within the localized area of the power grid are point-to-point or peer-to-peer.

7. The utility system of claim 1, wherein the plurality of meters employ native languages comprising: ANSI C12, IEC-61850, DNP, SEP, DLMS/COSEM, other standard application-layer languages, and other proprietary application-layer languages.

* * * * *